United States Patent Office 3,558,187
Patented Jan. 26, 1971

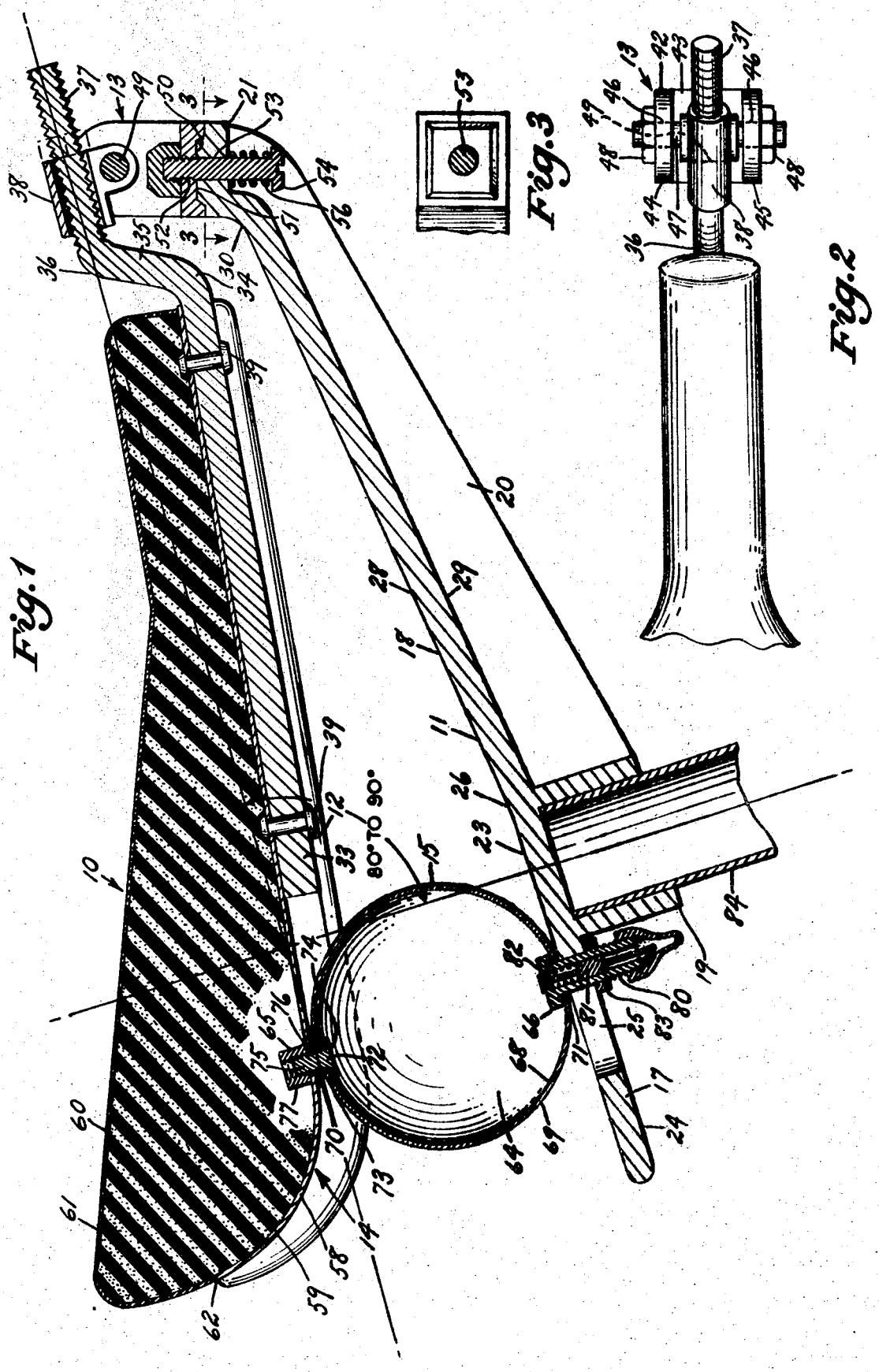

3,558,187
BICYCLE SEAT
Milton Morse, 1 Horizon Road, Fort Lee, N.J. 07024
Filed Mar. 11, 1969, Ser. No. 806,084
Int. Cl. B62j 1/26
U.S. Cl. 297—199                                   6 Claims

ABSTRACT OF THE DISCLOSURE

A bicyle seat having a lower frame element fixed to the seat post of a bicycle frame, and an upper frame element supporting a seat connected at the forward end thereof for relative pivotal movement with respect to the lower frame element about two mutually perpendicular axes, whereby the seat may pivot about a longitudinal axis to a limited degree as the user shifts his weight as the cycle is pedalled. Resilient means in the form of an inflated ball interconnects the seat element and the lower frame element in a vertical plane passing through one axis of rotation.

---

This invention relates generally to the field of bicycle seats, and more particularly to an improved form thereof which provides greater comfort and consequent reduction in fatigue to the bicycle rider.

Although the design of bicycle seats has reached a high stage of development in the art, and bicycle seats are relatively comfortable, the principal discomfort remaining comes from the fact that the rider, in pedalling the cycle must alternately raise one leg while lowering the other. This causes a rocking motion against the seat, and without regard to the degree of softness in the seat, the rocking motion causes the weight of the rider to be shifted from one relatively small area to the other. While to a seasoned cycle rider, this discomfort is acceptable, to a person who rides only occasionally, the rocking motion causes abrasion, blistering, and bruising.

It is therefore among the principal objects of the present invention to provide an improved bicycle seat or saddle incorporating a freedom of motion, wherein the same will rock from side to side to a limited degree to accommodate the shift of the body of the rider as he alternately raises one foot and bears down on the pedal with the other foot.

Another object of the invention lies in the provision of an improved seat or saddle incorporating the above object, without sacrifice of the normal up and down motion which is normally afforded by springs.

A further object of the invention lies in the privision of an improved bicycle seat or saddle which may maintain a longitudinal rigidity which prevents the same from yawing from side to side whereby the rider would lose a measure of control.

Yet another object of the invention lies in the provision of improved air suspension replacing the usual steel or rubber springs, to provide increased comfort, and adjustable resilient support.

A feature of the disclosed embodiment lies in the provision of shock absorbing means preventing either damage to the seat, or misalignment of its adjustment, should the cycle be accidentally dropped or pushed over wherein the side of the seat strikes the ground, in such event, it being possible to instantly realign the seat to its previous adjustment.

Another feature of the disclosed embodiment lies in the provision of a hollow relatively rigid shell forming the seat which is covered with rubber or polyeurythane foam for improved comfort.

These objects and features, as well as other incidental ends and advantages, will more fully appear in the progress of the following disclosure, and be pointed out in the appended claims.

In the drawing, to which reference will be made in the specification, similar reference characters have been employed to designate corresponding parts throughout the several views.

FIG. 1 is a vertical longitudinal central sectional view of an embodiment of the invention.

FIG. 2 is a fragmentary plan view thereof, corresponding to the upper right hand portion of FIG. 1.

FIG. 3 is a fragmentary horizontal sectional view as seen from the plane 3—3 in FIG. 1.

Before entering into a detailed description of the structural aspects of the invention, a brief discussion of the theory involved is believed apposite.

The art of bicycle riding dates back at least 200 years. During this time, many advances have been made in the design of all parts of the bicycle, including the bicycle seat. As the bicycle was improved, the ease in propelling the bicycle was enhanced. The biggest advance in the ease of propulsion came from the development of variable speed bicycles. The rate of this development has finally reached a degree where the rider is able to propel the machine with relatively little effort, although under the conditions of reduced effort, the machine moves at a slower pace. Due to the expenditure of less effort per minute, the rider now spends more time resting his weight on the saddle, and, therefore, saddle comfort becomes relatively more important. The springing mechanism in most saddles absorbs a great portion of the unevenness of the terrain over which the bicycle travels, and this greatly reduces the discomfort and fatigue of the rider. Also, saddles are often made of a cushioning material which adapts itself to the contour of the rider and this causes a more even distribution of the weight of the rider over the saddle. This, too, greatly reduces the amount of fatigue by still further reducing the discomfort of an otherwise hard seat. To my knowledge, no prior art construction incorporates a provision for a rocking of the seat about a longitudinal axis to accommodate for normal pedalling motion.

I have therefore devised a bicycle seat which combines all of the features hereinabove described, such as the springing or shock absorbing characteristic, and I have also taken advantage of the more recent developments in materials which are available for the construction of soft seats. To this I have added a freedom of motion wherein the saddle will rock from side to side to accommodate the shift of the body of the rider as he executes a pedalling motion.

Reference may be now made to the accompanying drawing, wherein the device, generally indicated by reference character 10, comprises broadly: a lower frame element 11, an upper frame element 12, a forward frame interconnecting element 13, a seat element 14 and a resilient element 15.

The lower frame element 11 may be formed as a casting of light metal, or as a welded stamping, and includes first and second planar members 17 and 18, respectively, a downwardly extending socket member 19, a pair of side wall members, one of which is indicated by reference character 20, and a forward terminal member 21.

The first planar member 17 is bounded by an upper surface 23 and a lower surface 24, a longitudinally positioned slot 25 communicating between said surfaces. A bent portion 26 connects with the second planar member 18, which is also bounded by upper and lower surfaces 28 and 29, respectively. A forwardly disposed bent portion 30 leads to the terminal 21.

The upper frame element 12 is of cylindrical cross section, and includes a first rectilinear portion 33, a bent portion 34, a second rectilinear portion 35, a bent portion 36, and a threaded portion 37 engaging a threaded bushing 38 which forms part of the frame interconnecting element 13. Rivet or bolt means 39 interconnects the first rectilinear portion 33 to the seat element 14.

The frame interconnecting element 13 includes a clevis member 42 having a base portion 43 and axially aligned trunnions 44 and 45. Aligned orifices 46 are penetrated by a threaded pintle 47 and maintained in position by two nuts 48, the pintle penetrating a transversely extending bore 49 in the threaded bushing 38, to permit movement thereof about a horizontal transversely extending axis.

The base portion 43 is provided with a downwardly facing polygonal recess 50 engaging a corresponding projection 51 on the forward terminal 21. Aligned bores 52 and 53 are penetrated by a threaded bolt 54 engaging a cap nut 55 to maintain the two parts together. A coil spring 56 surrounds the shank of the bolt 54 to form resilient detent means. As will be apparent from a consideration of FIGS. 1 and 3, should the cycle (not shown) be dropped such that the seat element 14 strikes the ground, the spring 56 will compress, permitting disengagement of the projection 51 from the recess 50, and limited relative pivotal movement about a substantially vertical axis. When the cycle is returned to normal position, the detent means will re-engage, either with manual assistance, or the presence of the straightening force exerted by the resilient element 15.

The seat element 14 includes a stamped metallic or molded synthetic resinous shell 58 which is filled with molded foam rubber or polyurethane material generally indicated by reference character 59. The upper surface thereof is covered by a sheet of suitable synthetic resinous material and forms a peripheral area 61 to prevent any cutting effect on the rider by the edge 62 of the shell 58.

The resilient element 15 includes an air retaining ball member 64, upper attachment means 65 and lower attachment means 66. The ball member is preferably formed of a strong polyvinyl copolymer material having a high degree of flexibility, but a very limited degree of stretch. It is bounded by an inner surface 68 and an outer surface 69, between which an upper opening 70 and a lower opening 71 extend along a common diameter.

The upper attachment means 65 may include a threaded sealing screw 72 having an O-ring 73 disposed under the head 74. The threaded shank 75 penetrates an opening 76 in the shell 58 and engages a threaded bushing 77.

The lower attachment means 66 includes a conventional valve stem 80 having a core 81 of conventional type and spring means 82, the stem 80 penetrating the slot 25. A locking nut 83 clamps the sides of the slot 25, and fixes the position of the lower attachment means 66, after proper longitudinal adjustment of the seat element relative to the lower frame element has been established by rotation of the threaded portion 37 within the bushing 38.

It will be observed that since the seat is fixed at the rearward portion thereof only at a single point, very close to the axis of the threaded portion 37, side to side pivotal motion within the limits of distortion of the ball 64 is available. Further, since rocking motion of greater amplitude progressively brings greater resistance (owing to increased distortion of the ball), the seat element is self leveling, and no greater pivotal action than that actually required by the motion of the rider occurs. Unlike conventional metallic or rubber springs, by controlling the degree of inflation of the ball 64, the degree of permissible side to side motion may also be controlled, as can the degree of cushioning action available in a vertical plane supporting the weight of the rider.

For conventional bicycle frames, I have found it most comfortable to construct the device such that the axis of the threaded member 37 is normally disposed at an angle of between 80° and 90° with respect to the axis of the seat post 84, and this angular relationship can also be adjusted by varying the degree of inflation of the ball 64.

I wish it to be understood that I do not consider the invention limited to the precise details of structure shown and set forth in this specification, for obvious modifications will occur to those skilled in the art to which the invention pertains.

I claim:

1. Improved bicycle seat construction comprising: a lower frame element and an upper frame element, each frame element having a principal longitudinal axis lying in a common vertical plane, and being mutually interconnected at the forward ends thereof for relative pivotal movement about an axis lying within said vertical plane.

2. Structure in accordance with claim 1, including means for interconnecting said upper and lower frame elements for pivotal movement about two substantially mutual perpendicular axes, one of said axes being substantially perpendicular to said vertical plane.

3. Structure in accordance with claim 1, including seat means mounted upon said upper frame element.

4. Structure in accordance with claim 3, including pneumatic means interconnecting said seat means and said lower frame element at points lying substantially in said vertical plane.

5. Structure in accordance with claim 4, said pneumatic means including an air-filled substantially inextensible sphere interconnected at two diametrically opposite points to said seat means and lower frame element.

6. Structure in accordance with claim 5, including resilient detent means interconnecting said lower and upper frame elements at the forward ends thereof to allow limited relative pivotal movement about an axis perpendicular to both said two mutually perpendicular axes.

References Cited

UNITED STATES PATENTS

| | | | |
|---|---|---|---|
| 477,123 | 6/1892 | Johnson | 297—199 |
| 585,984 | 6/1897 | Byrnes | 297—215X |

JAMES T. McCALL, Primary Examiner

J. C. MITCHELL, Assistant Examiner